United States Patent [19]
Kajiyama et al.

[11] Patent Number: 4,926,428
[45] Date of Patent: May 15, 1990

[54] METHOD AND APPARATUS FOR SENSING THE WAVELENGTH OF A LASER BEAM

[75] Inventors: Koichi Kajiyama; Kaoru Saito, both of Fujieda; Yasuo Itakura, Hiratsuka; Osamu Wakabayashi, Hiratsuka; Masahiko Kowaka, Hiratsuka; Tadayoshi Yamaguchi, Hiratsuka, all of Japan

[73] Assignee: Kabushiki Kaisha Komatsu Seisakucho, Tokyo, Japan

[21] Appl. No.: 155,921

[22] PCT Filed: Aug. 31, 1987

[86] PCT No.: PCT/JP87/00646
§ 371 Date: Jan. 29, 1988
§ 102(e) Date: Jan. 29, 1988

[87] PCT Pub. No.: WO89/02068
PCT Pub. Date: Mar. 9, 1989

[51] Int. Cl.[5] .............................................. H01S 3/10
[52] U.S. Cl. ...................................... 372/20; 372/24; 372/76
[58] Field of Search .................. 372/20, 24, 32, 76, 372/87, 31, 29

[56] References Cited

U.S. PATENT DOCUMENTS 4,450,565 5/1984 Copeland ............................. 372/32
4,451,766 5/1984 Angle et al. ......................... 372/29

OTHER PUBLICATIONS

Analytical Chemistry, Aug., 1982, pp. 1006A–1018A.
Applied Physics, vol. 53, No. 7, 1984, pp. 590–599.
Handbook of Applied Spectroscopy, pp. 828–836 by Asakura Shoten of Nov. 25, 1978.
SPIE 1986, Microlithography.
Optics Communications, vol. 30, No. 2, Aug. 1979.
IEEE Journal of Quantum Electronics, vol. QE-15, No. 3, Mar. 1979.

Primary Examiner—Léon Scott, Jr.
Attorney, Agent, or Firm—Diller, Ramik & Wight

[57] ABSTRACT

A method and apparatus for sensing the wavelength of a laser beam using an optogalvano effect by atoms or molecules in plasma. Atoms or molecules in the plasma are irradiated with the laser beam. The impedance of the plasma at that time is sensed to sense whether the wavelength of the laser beam coincides with a predetermined absolute wavelength. The sensed result is used to control the wavelength of the laser beam.

11 Claims, 4 Drawing Sheets 4,926,428

METHOD AND APPARATUS FOR SENSING THE WAVELENGTH OF A LASER BEAM

TECHNICAL FIELD

This invention relates to a method and apparatus for sensing the wavelength of a laser beam oscillated by a laser oscillator, and more particularly such method and apparatus which uses a laser optogalvanic system (hereinafter referred to as the LOG system) as a sensing system.

BACKGROUND ART

Conventionally, in order to know the wavelength of a laser beam, the laser beam irradiated from a laser beam source 1 is processed by a preprocessing system 2 including a lens and a filter so as to be suitable for a spectroscope 3, as shown in FIG. 8. The processed beam is then guided into an incident slit $3a$ in the spectroscope 3 and introduced in the direction determined by diffraction gratings $4b$ and $3c$ (or prisms) and a rotary stage in the spectroscope 3. The beam exiting the output slit $3d$ is then sensed to a signal processing system 4 to sense the wavelength of he laser beam from the angle of the rotary stage (the relationship between the angle of the rotary stage and the wavelength is known in advance).

Therefore, where the wavelength of the laser beam is controlled to a predetermined value, the angle of the rotary stage is adjusted in advance such that when a laser beam having a predetermined wavelength is entered, the beam is irradiated from the outlet slit $3d$, and the wavelength of the laser beam is identified by a wavelength selective means (for example, an adjustable etalon) such that the laser beam is irradiated from the outlet slit $3d$.

The identification of the wavelength using the spectroscope is, however, necessarily accompanied by troublesome alignment. In addition, in order to obtain a good result of analysis, a large-sized spectroscope is needed to thereby increase the entire size and cost of the system.

This invention derives from the contemplation of these situations. The object of this invention is to provide an apparatus which is capable of sensing and controlling the wavelength of a laser beam without using a spectroscope and a method of controlling the wavelength of the laser beam.

DISCLOSURE OF THE INVENTION

This invention senses the wavelength of an input laser beam using an LOG system.

The LOG system utilizes an optogalvano effect in which the electrical property of plasma is changed when it is irradiated with light resonant with the optical transition of the atoms and particles in the plasma. The wavelength of the resonant light which creates the reaction corresponds to the wavelength inherent to the atoms and particles in the plasma, so that the LOG system is used in quantitative analysis, the analysis of a molecular structure, etc.

If the plasma A between electrode plates $10a$ and $10b$ of a discharge tube 10 used in the LOG system which is charged and discharged in advance as shown in FIG. $2(a)$ is irradiated with a laser beam, ions will increase in number as shown in FIG. $2(b)$. Therefore, the impedance of the plasma is decreased and this change can be extracted as a voltage (current) signal from the discharge tube 10. For example, when an iron hollow cathode lamp is used as the discharge tube 10, iron plasma exists between the electrode plates, so that a signal such as is shown by a graph in FIG. 2 is obtained in accordance with the wavelength of the irradiated laser beam.

Therefore, a specific pattern produced by substances present in the discharge tube when the substances are irradiated with a laser beam and corresponding to the wavelength of the irradiated laser beam, is measured and determined in advance using the characteristic of the LOG system. An electrical signal produced by the irradiation of the laser beam and the pattern are compared to sense the wavelength of the laser beam which is being produced at present.

According to this invention, predetermined atoms or molecules in plasma are irradiated with a laser beam as an object to be sensed, the impedance of the plasma at that time is sensed, and the sensed impedance is compared with an impedance pattern measured in advance to thereby sense the wavelength of the laser beam as the object to be sensed.

This invention includes plasma generating means for generating plasma containing predetermined atoms or molecules, laser beam irradiating means for irradiating the plasma, generated by the plasma generating means, with a laser beam as an object to be sensed, impedance sensing means for sensing the impedance of the plasma containing the atoms or molecules, and identifying means for comparing the impedance, sensed by the impedance sensing means, with a known impedance pattern measured in advance and identifying the wavelength cf the laser beam on the basis of the comparison.

BRIEF DESCRIPTION OF THE DRAWINGS

FIGS. $2(a)$ and $(b)$ are views used for illustrating an LOG system related to this invention.

BEST MODE FOR CARRYING OUT THE INVENTION

Figure 1:
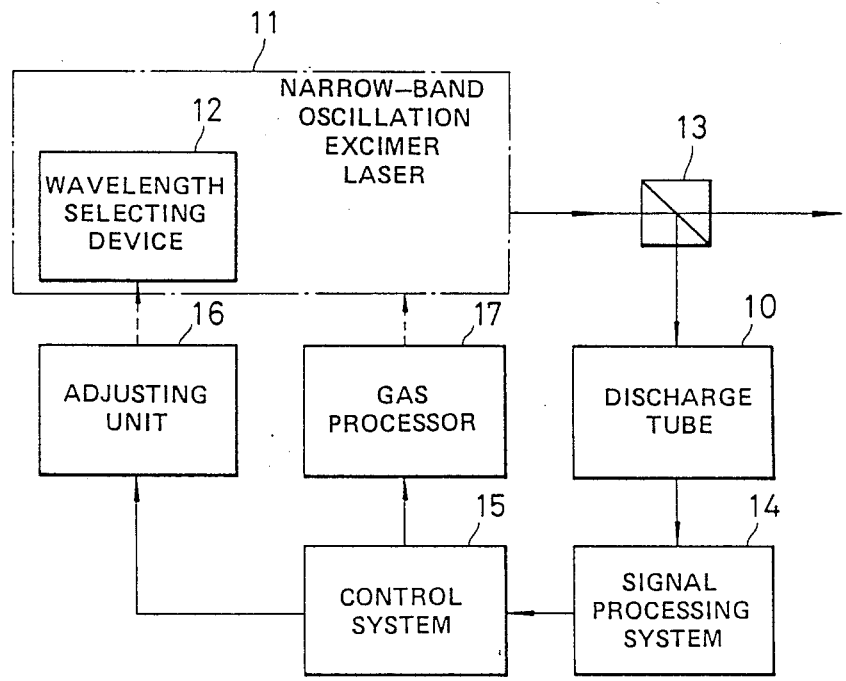
FIG. 1 is a block diagram showing one embodiment of this invention.
Figures 2A, 2B:
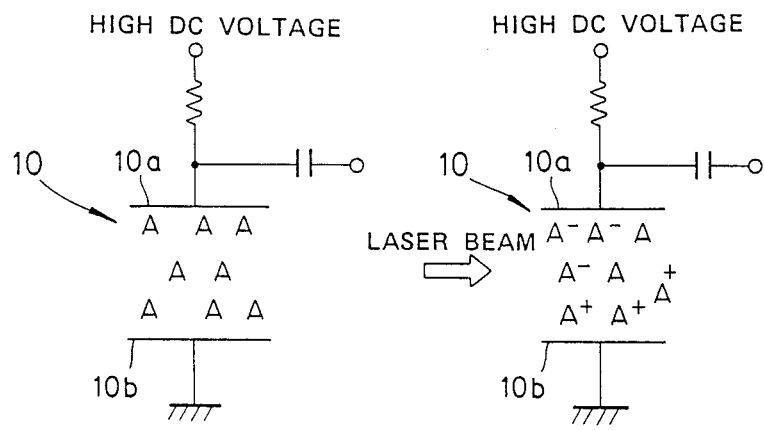

FIG. 1 is a block diagram showing one embodiment of a device which controls the wavelength of a laser beam using the above discharge tube. In FIG. 1, a KrF narrow band oscillation excimer laser 11 oscillates and generates a laser beam having a wavelength of about 248.35 mm in an ultraviolet area. An etalon 12 which is one of wavelength selective means allows only a laser beam having a particular wavelength among the various laser beams to transmit therethrough. A beam splitter 13 splits a laser beam incident thereon into two parts, one being guided to a main application and the other being guided to the discharge tube 10.

The discharge tube 10 outputs an electrical signal corresponding to the wavelength of the irradiated laser beam, as described above. For example, it output a signal such as that shown in FIG. 3 by enclosing iron plasma into the discharge tube. The signal output from the tube 10 is applied via a signal processing system 14 to a control system 15.

Figure 3:
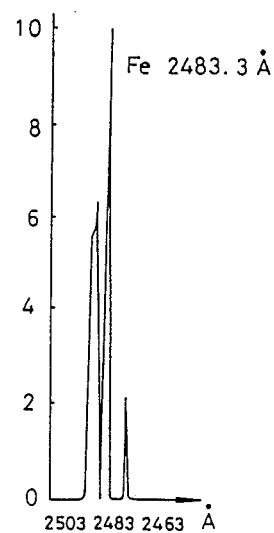
FIG. 3 is a graph showing the output vs. incident wavelength in a discharge tube in FIG. 1.

The control system 15 previously stores a signal pattern shown in FIG. 3, compares an electrical signal input from the discharge tube 10 with the signal pattern stored in advance to sense whether the wavelength of the laser beam provided at present to the main application coincides with a target wavelength (for example, of 248.33 mm). If the provided wavelength does not coincide with target wavelength, the control system 15 controls either a gas processor 17 or an adjusting unit 17 or both such that the wavelength of the provided laser beam coincides with the target wavelength. Namely, the control system controls the gas processor 17 such that the gas processor changes the composition of the laser medium gas supplied to the excimer laser 11 to thereby move the wavelength of the laser beam toward the target wavelength. The control system controls the adjusting unit 16 such that when the selecting element includes an air-gap etalon the adjusting unit changes at least one of the angle formed between the etalon and the optical axis of the laser beam, the gap in the etalon, and the pressure and gas in the gap in the etalon to thereby move the wavelength of the laser beam toward the target wavelength.

The adjustment is repeated until the output signal from discharge tube 10 coincides with the peak value of the signal pattern stored in advance (for example, the output obtained when a laser beam having a wavelength of 248.33 mm is entered) to thereby obtain a laser beam having a wavelength of 248.33 mm).

In a signal pattern for input wavelength such as that shown in FIG. 3, the adjustable target wavelength is not limited to the wavelength corresponding to the maximum peak value, but may be the wavelength corresponding to another peak value. Alternatively, any wavelength between the wavelengths corresponding to adjacent peak values may be a target one by interpolation between these adjacent peak values. A signal pattern having a peak at the target wavelength may be obtained by changing the plasma to be enclosed as required.

Figure 4:
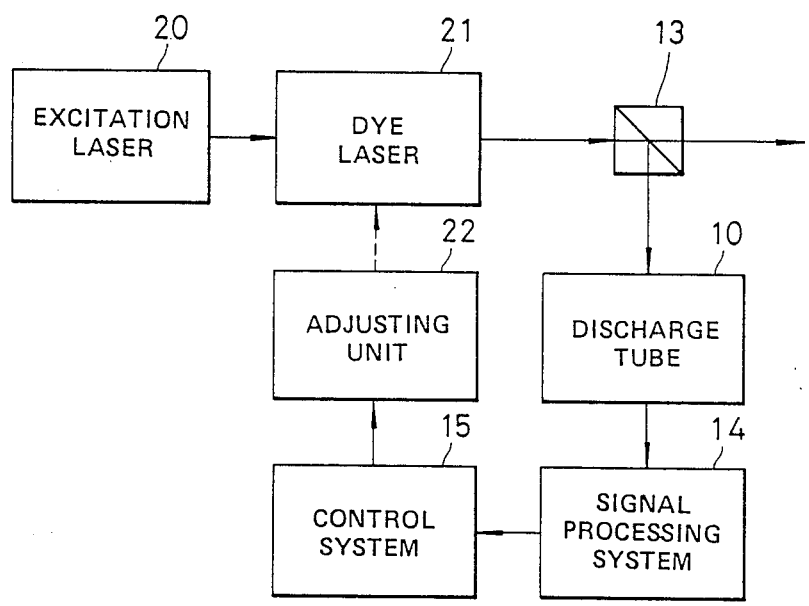
FIG. 4 is a block diagram showing another embodiment of this invention.

FIG. 4 shows an embodiment of a device which controls the wavelength of a dye laser. Like reference numerals are used to denote like elements in FIGS. 4 and 1 and further description therefor will be omitted.

In FIG. 4, the dye laser 21 oscillates a laser beam due to optical pumping from an excitation laser 20 including an excimer laser, a YAG laser or the like. The adjusting unit 22 drives the stage of the dye laser 21 such that the oscillating wavelength of the laser beam becomes a target wavelength in accordance with a signal from the control system 15. Alternatively, the kind and density of a solvent in the dye laser 21 may be adjusted so as to control the oscillating wavelength.

Figure 5:
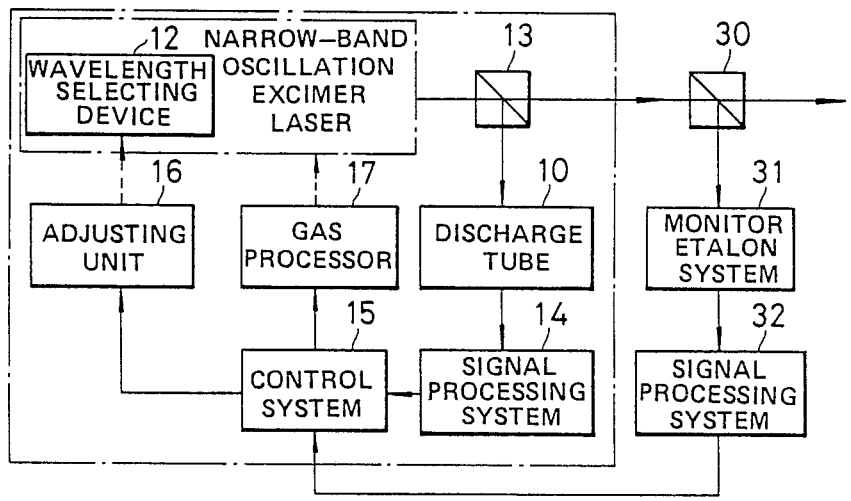
FIG. 5 is a block diagram of a further embodiment of this invention, FIGS. $6(a)$, $(b)$ and $(c)$ are each a view used for illustrating a monitor etalon system of FIG. 5.

FIG. 5 shows another embodiment of this invention. This device includes a beam splitter 30, a monitor etalon system 31 and a signal processing system 32 in addition to the device of FIG. 1 enclosed by a dot-dashed line.

The laser beam adjusted to the target wavelength by the device of FIG. 1 is split by the beam splitter 30 and guided to the etalon system 31.

Figures 6A, 6B, 6C:
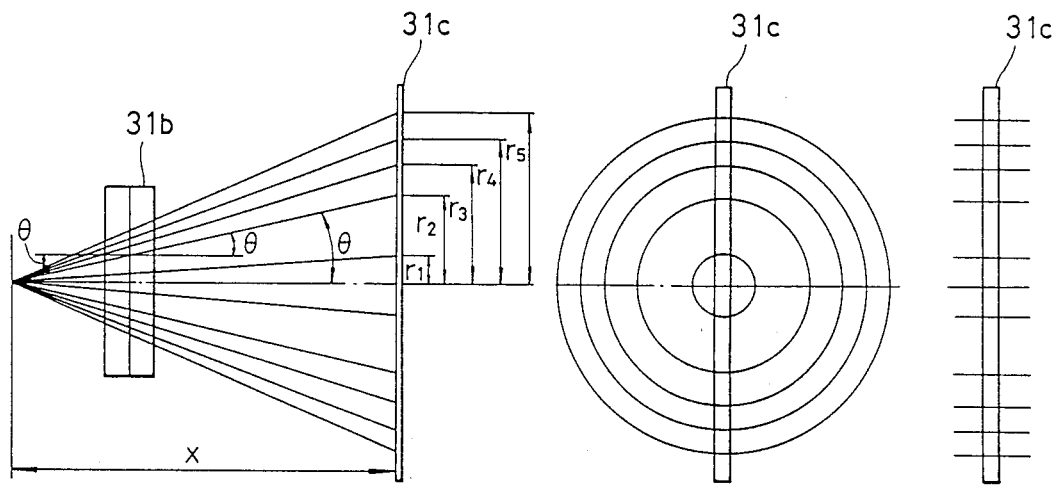

The monitor etalon system 31, shown in FIG. 6(a), includes a lens 31a, an etalon 31b and a line image sensor 31c. The lens 31a enlarges and guides the incident laser beam via the etalon 31b to the sensing surface of the line image sensor 31c. Interference fringes are formed on the sensing surface, as shown in FIG. 6(b), and the image sensor 31c transmits information on the positions of the fringes and the spacings between the respective adjacent fringes via the signal processing system 32 to the control unit 15.

The control unit 15 calculates the wavelength of the laser beam from the input information. The etalon 31b allows a laser beam satisfying the following formula to transmit therethrough, $$m\lambda = 2d \cos \theta \quad (1)$$

where m is the order, $\lambda$ is the wavelength, and d is the gap in the etalon 31b.

Since $\theta$ is given by $\tan^{-1}(r_i/x)$ in FIG. 6(a), the wavelength $\lambda$ can be known on the basis of the formula (1) if the value of $r_i$ (the position of an interference fringe) can be known. Assuming that we have $r_1 = 0.587$ mm, $r_2 = 1.827$ mm, $r_3 = 2.516$ mm, $R_4 = 3.054$ mm, and $r_5 = 3.510$ mm, $\lambda = 248.35$ mm is obtained as the wavelength of the laser beam from the above formula.

A cylindrical lens may be used instead of a spherical lens 31a in FIG. 6. In that case, the resulting interference fringes are parallel lines, as shown in FIG. 6(c). The use of the parallel interference fringes shown in FIG. 6(c) results in the position detection higher in accuracy by an amount corresponding to the absence of curvatures in the fringes therein than the use of concentric interference fringes shown in FIG. 6(b). The output from monitor etalon system 31 is applied to the control system 15 via the signal processing system 32.

The control system 15 compares the target wavelength and the wavelength obtained in the above manner and outputs a control signal to the adjusting unit 16 and gas processor 17 such that the oscillating wavelength coincides with target wavelength.

It is not necessarily required for the control unit 15 to obtain the wavelength on the basis of the output from the monitor etalon system 31. The monitor etalon system 31 may beforehand store the positions of the interference fringes produced when the target wavelength laser beam is entered, and the control system may output a control signal such that the positions of the sensed interference fringes are formed at the positions where the corresponding interference fringes are stored.

Figure 7:
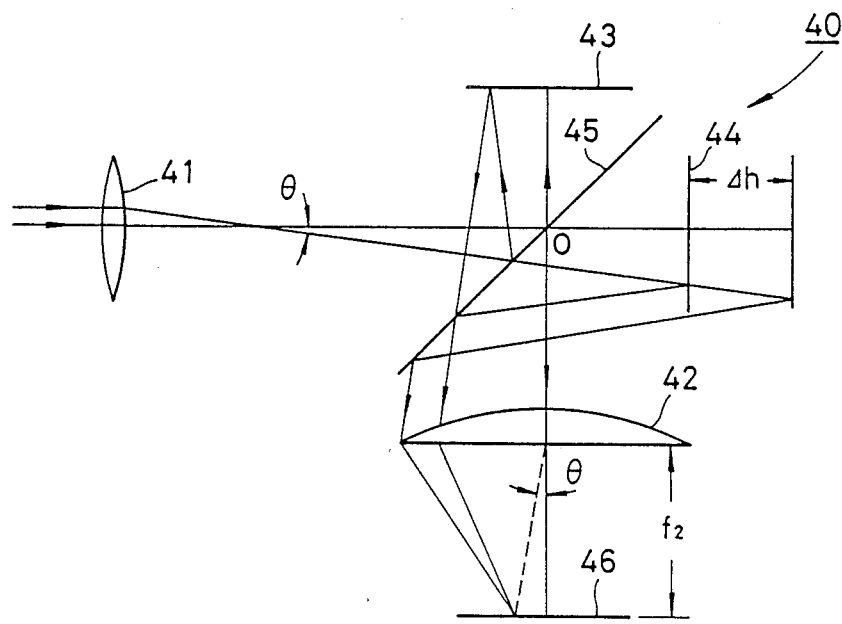
FIG. 7 is a view showing a Michelson interferometer and FIG. 8 is a block diagram showing a conventional device.
Figure 8:
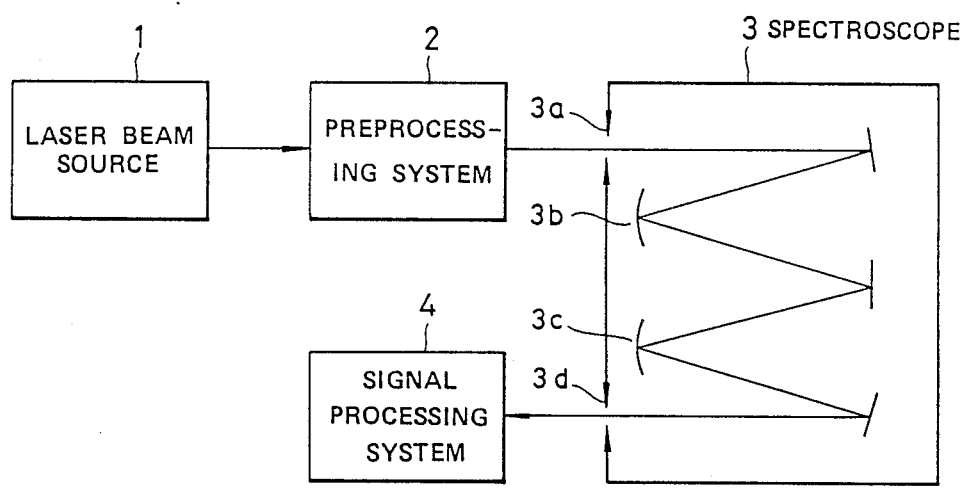

Instead of the monitor etalon system 32, a Michelson interferometer may be used. As shown in FIG. 7, the Michelson interferometer 40 includes two lenses 41 and 42, two total-reflectior mirrors 43 and 44 and a beam splitter 45. When the mirror 43 and 44 are at equal distances from the point 0, the laser beams split equally by the beam splitter 45 travel the equal optical distances, and arrive at the focusing surface 46, so that the image of the incident beam as it is appears on the focusing surface. The size of the image can change depending on the magnification of the lens.

When the mirror 44 is moved by $\Delta h$ backwardly, the beam reflected by the mirror 44 travels an optical path longer by an optical distance of $2\Delta h \cos \theta$, and arrives at the focusing surface 46, so that the light beams intensify each other at the position of $\theta$ to thereby form a bright ring having a radius of $f_2 \tan \theta$ related to the $\theta$ on the focusing surface 46 if the optical distance satisfies the following formula for the wavelength $\lambda$, $$2\Delta h \cos \theta = m\lambda \quad (2)$$

As will be obvious from the formula (2), when $\Delta h$ is, in contrast, fixed to a particular value (1 mm or 0.1 mm), $\theta$ or the radius of the ring changes depending on the wavelength $\lambda$.

Therefore, if a line image sensor is disposed on the focusing surface 46 so as to sense a bright ring, changes in the wavelength will be sensed electrically.

While in the embodiment the control system 15 automatically controls the adjusting unit 16 and gas processor 17 such that the oscillating wavelength coincides with a target wavelength, the operator may periodically adjust the adjusting unit 16 or gas processor 17 manually such that the oscillating wavelength coincides with the target wavelength.

INDUSTRIAL APPLICABILITY

As just described above, according to this invention, the use of a spectroscope is avoided, so that the device is simplified. The sensing system includes a simple electric circuit, so that after entrance of a light beam into the LOG system, optical alignment is unnecessary and the sensing system is easy to handle. The electric circuit is simple, so that the cost is reduced by about one figure compared to a large-scale spectroscope. The use of a laser beam produced according to this invention as a reduced projection exposure light source allows the exposure wavelength to accurately lock to a predetermined wavelength, so that a focusing error is eliminated and the yield is improved.

I claim:

1. A method of sensing the wavelength of a laser beam as an object to be sensed, comprising the steps of irradiating predetermined atoms or molecules in plasma with the laser beam, sensing the impedance of the plasma at that time, and comparing the impedance with an impedance pattern measured in advance.

2. A method of sensing the wavelength of a laser beam according to claim 1, wherein the predetermined atoms or molecules in the plasma perform a specific optical transition for a wavelength in the vicinity of the wavelength of the laser beam.

3. An apparatus for sensing the wavelength of a laser beam, comprising:
   plasma generating means for generating plasma containing predetermined atoms or molecules;
   laser irradiating means for irradiating the plasma, generated by the plasma generating means, with a laser beam as an object to be sensed;
   impedance sensing means for sensing the impedance of the plasma containing predetermined atoms or molecules; and
   identifying means for comparing the impedance, sensed by the impedance sensing means, with a known impedance pattern measured in advance and identifying the wavelength of the laser beam on the basis of the comparison.

4. An apparatus for sensing the wavelength of a laser beam according to claim 3, wherein the plasma generating means comprises a gas containing predetermined atoms or molecules enclosed between a first and a second electrodes, the first electrode being grounded and the second electrode being impressed with a high voltage.

5. An apparatus for sensing the wavelength of a laser beam according to claim 4, wherein the gas containing predetermined atoms or molecules is a rare gas.

6. An apparatus for sensing the wavelength of a laser beam according to claim 4, wherein the impedance sensing means senses changes in an electric current flowing across the first and second electrodes.

7. An apparatus for sensing the wavelength of a laser beam according to claim 3, wherein the plasma generating means includes a hollow cathode lamp.

8. An apparatus for sensing the wavelength of a laser beam according to claim 3, wherein scanning means controls wavelength selecting means in the laser oscillator which oscillates the laser beam as an object to be sensed.

9. An apparatus for sensing the wavelength of a laser beam, comprising:
   plasma generating means for generating plasma containing predetermined atoms or molecules;
   laser irradiating means for irradiating the plasma, generated by the plasma generating means, with part of the laser beam output from a laser oscillator;
   impedance sensing means for sensing the impedance of the plasma containing predetermined atoms or molecules;
   identifying means for comparing the impedance, sensed by the impedance sensing means, with a known impedance pattern measured in advance and identifying the wavelength of the laser beam output from the laser oscillator on the basis of the comparison; and
   control means for controlling the wavelength of the laser beam output from the laser oscillator on the basis of the wavelength identified by the identifying means.

10. An apparatus for sensing the wavelength of a laser beam, comprising:
    plasma generating means for generating plasma containing predetermined atoms or molecules;
    laser irradiating means for irradiating the plasma, generated by the plasma generating means, with part of the laser beam output from a laser oscillator;
    impedance sensing means for sensing the impedance of the plasma containing predetermined atoms or molecules;
    identifying means for comparing the impedance, sensed by the impedance sensing means, with a known impedance pattern measured in advance and identifying the wavelength of the laser beam output from the laser oscillator on the basis of the comparison;
    first control means for controlling the wavelength of the laser beam output from the laser oscillator on the basis of the wavelength identified by the identifying means;
    wavelength sensing means for sensing the wavelength of the laser beam output from the laser oscillator; and
    second control means for further controlling the wavelength of the laser beam output from the laser oscillator on the basis of the output from the wavelength sensing means.

11. An apparatus for sensing the wavelength of a laser beam according to claim 10, wherein the wavelength sensing means includes a monitor etalon.

* * * * *